United States Patent

Bill et al.

[11] Patent Number: 6,158,558
[45] Date of Patent: Dec. 12, 2000

[54] ELECTROMECHANICAL DISC BRAKE

[75] Inventors: Karlheinz Bill, Dreieich; Jürgen Balz, Hünstetten-Oberlibbach; Vladimir Dusil, Griesheim, all of Germany

[73] Assignee: Continental Teaves AG & Co. OHG, Germany

[21] Appl. No.: 09/230,007

[22] PCT Filed: Jul. 11, 1997

[86] PCT No.: PCT/EP97/03689

§ 371 Date: May 19, 1999

§ 102(e) Date: May 19, 1999

[87] PCT Pub. No.: WO98/03801

PCT Pub. Date: Jan. 29, 1998

[30] Foreign Application Priority Data

Jul. 17, 1996 [DE] Germany ............... 196 28 804

[51] Int. Cl.⁷ .......................... F16D 55/16; F16D 55/08; H02K 5/16
[52] U.S. Cl. .................. 188/162; 188/72.1; 188/72.7; 310/83
[58] Field of Search .................. 188/72.1, 72.2, 188/72.3, 72.7, 72.8, 106 A, 156, 158, 161, 162, 163; 310/77, 80, 83, 93, 103, 109; 303/115.2

[56] References Cited

U.S. PATENT DOCUMENTS

| 4,804,073 | 2/1989 | Taig et al. ................. 188/72.1 |
| 4,836,338 | 6/1989 | Taig . | |
| 4,850,457 | 7/1989 | Taig ....................... 188/72.1 |
| 5,829,557 | 11/1998 | Halasy-Wimmer et al. ......... 188/162 |

FOREIGN PATENT DOCUMENTS

| 246 770 | 11/1987 | European Pat. Off. . |
| 275 783 | 7/1988 | European Pat. Off. . |
| 43 20 205 | 12/1994 | Germany . |
| 195 11 287 | 1/1996 | Germany . |
| WO88/04741 | 6/1988 | WIPO . |

Primary Examiner—Chris Schwartz
Attorney, Agent, or Firm—Rader, Fishman & Grauer PLLC

[57] ABSTRACT

The present invention relates to an electromechanically operated disc brake for motor vehicles, which consists of a floating-type brake caliper as well as an actuating unit arranged on the caliper. The actuating unit exhibits an electric motor which adjusts an actuating element via a reducing gear. The actuating element in turn causes one of two friction linings provided in the brake caliper in a displaceable manner to be brought into engagement with a brake disc. In order to be able to maintain high clamping forces with very low electric power, the present invention proposes that means (20 or 21,22) be provided to prevent reverse rotation of the rotor (10) of the electric motor (6) when the current supplied to the electric motor (6) is switched off after said electric motor (6) was activated. At the same time, this measure minimizes heating of the electric motor.

8 Claims, 3 Drawing Sheets

ELECTROMECHANICAL DISC BRAKE

BACKGROUND OF THE INVENTION

The present invention relates to an electromechanically operated disc brake for motor vehicles with a caliper as well as an actuating unit located on the caliper, and with two limitedly displaceable friction linings located in the caliper, each of which acts together with one side of a brake disc respectively, wherein one of the friction linings can be brought into engagement with the brake disc directly by the actuating unit via an actuating element and the other is brought into engagement with the brake disc through the effect of the reaction force generated by the caliper, and wherein the actuating unit exhibits an electric motor arranged coaxially to the actuating element as well as a reducing gear unit arranged between the electric motor and the actuating element, with the rotor of the electric motor being ring-shaped and radially disposed about the reducing gear unit.

This type of electromechanically operated disc brake is known from DE-A-195 11 287.3, for example. The actuating unit of the known disc brake consists of an electric motor, whose rotor drives a threaded nut by means of a roller screw drive element or a sun gear. The rotation of the threaded nut is transmitted to an actuator sleeve or causes its axial displacement, and this in turn causes the friction lining activated by the actuating unit to be brought into engagement with the brake disc. For this purpose, the rotor of the electric motor preferably is radially disposed about the roller screw drive element. Unfavorable features of the known electromechanically operated disc brake, in particular, are the relatively high consumption of electric power as well as considerable heating of the electric motor, which occur especially whenever high clamping forces have to be applied for a long period of time.

Hence, the object of the present invention is to propose an electromechanically operated disc brake of the type described above, which can maintain high clamping forces with very slight electric power after these have been applied. In addition, the heating of the electric motor is to be reduced to a minimum.

SUMMARY OF THE INVENTION

This object is solved by the present invention in that means are provided which prevent reverse rotation of the electric motor's rotor when the current supplied to the electric motor is switched off after the electric motor was activated.

In order to render more concrete the concept of the present invention, it is provided that the above-described means be made up of an electromagnet, whose armature is coupled to the rotor rotationally in such a way that longitudinal displacement is possible. The special feature of this type of actuator is the utilization of small air gaps and the ensuing very high starting power.

An advantageous embodiment of the object of the invention provides that there is a force-transmitting connection between the armature and the threaded nut. The armature, for example, can be coupled to the threaded nut by means of a positive-locking or a non-positive connection. For this purpose, the positive-locking connection preferably consists of radial projecting parts formed integrally with or provided on the armature, with said projecting parts being received in grooves provided in the threaded nut. In contrast, the non-positive connection between the armature and threaded nut is formed by means of flexible sheet metal strips which allow a limited relative displacement of the two parts towards each other in an axial direction. These measures ensure that, in case of a power failure in the brake system, the electric magnet and, consequently, the stop function of the brake always reaches the safe state, so that blocking of the brakes in case of a power failure is excluded.

The electric power supplied to the electric magnet is minimized in another advantageous feature of the invention, which provides for a high-resistance winding of the coil of the electric magnet.

BRIEF DESCRIPTION OF THE DRAWINGS

The invention is described in more detail on the basis of an embodiment and the following drawings.

DETAILED DESCRIPTION OF THE DRAWINGS

Figure 1:
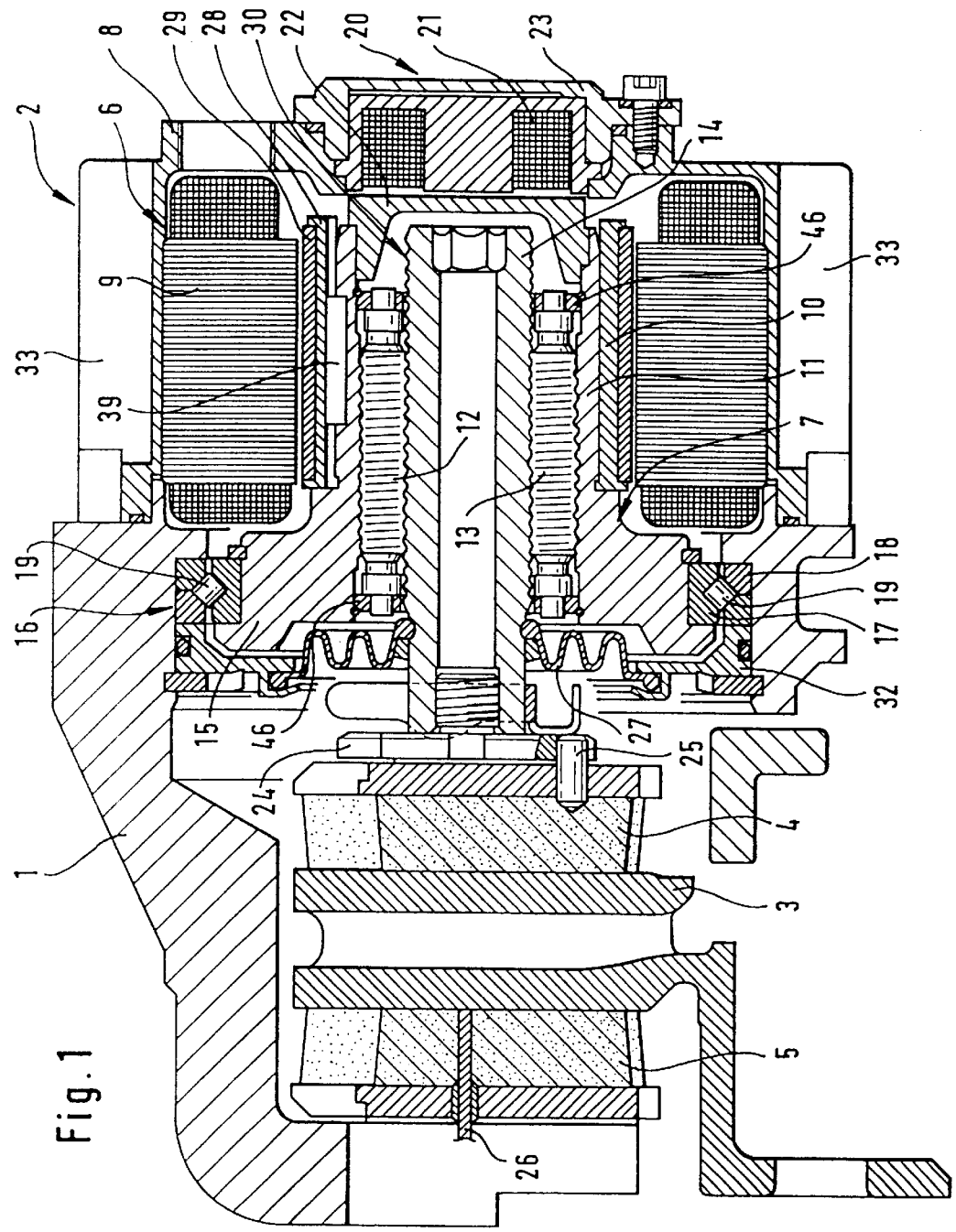
FIG. 1 is an axial section view of an embodiment of the electromechanically operated disc brake according to the present invention.

The electromechanically operated disc brake according to the present invention shown in the drawing, which is a floating-caliper disc brake in the example shown, essentially consists of a brake caliper 1 displaceably mounted in a fixed mounting bracket (not shown) as well as an actuating unit 2, whose housing 8 is fastened to the brake caliper 1 by means of fastening elements that are not shown. A pair of friction linings 4 and 5 is located in the brake caliper 1 in such a way that the linings face the left and right side of a brake disc 3.

In the description below, the friction lining 4 shown on the right will be referred to as the first friction lining and the other, assigned reference number 5, will be referred to as the second friction lining.

Whereas the first friction lining 4 is brought into engagement directly with the brake disc 3 through the actuating unit 2 by means of an actuating element 30, the second friction lining 5 is pressed against the opposite side of the brake disc 3 through the effect of a reaction force generated by brake caliper 1 as a result of the activation of the arrangement.

The above-mentioned actuating unit 2 consists of an electric motor 6 which is designed as a permanent magnet, electronically commutatable (torque) motor in the example shown. Its stator 9 is stationary within the housing 8 and its rotor 10, which is designed as a hollow shaft, is formed by a tubular support 28 that holds several permanent magnet segments 29. A reducing gear 7, which is designed as a roller screw drive element 11 to 14 in the example shown, is located between the torque motor 6 and the above-mentioned actuating element 30, which is preferably arranged coaxially to the motor. The roller screw drive element consists of a threaded nut 11 as well as a threaded spindle 14 which makes up the above-mentioned actuating element, wherein threaded rollers 12, 13 are arranged parallel to the axis in the threaded nut 11, and the threaded rollers rotate planet-like without axial displacement, causing an axial motion of the threaded spindle 14. Two guiding discs 40 provided on the ends of the threaded rollers 12, 13 and gear rings that are not shown ensure radial guidance of the threaded rollers 12, 13.

The arrangement is such that the rotor 10 of the torque motor 6 is coupled with torsional strength, for example by means of a feather key 39, to the threaded nut 11, whereas the threaded spindle 14 activates the first friction lining 4 via a force-transmitting plate 24. A twist stopping element 25 is preferably arranged between the force-transmitting plate 24 and the first friction lining, with said twist stopping element 25 being formed by a pin pressed into the friction lining 4 that is received in a recess on the power-transmitting plate 24. A radial bearing, a cross cylindrical roller bearing 16 in the example shown, is provided as guidance for both the reducing gear 7 and the hollow shaft or rotor 10, with said radial bearing consisting of an outer bearing ring 18 made up of two halves in FIG. 2, which acts together with the brake caliper 1, an inner bearing ring 17 arranged on a collar-shaped radial extension 15 of the threaded nut 11 as well as several cylindrical rollers 19 arranged between the two bearing rings 17, 18. The bearing rings 17, 18 form four tracks arranged at right angles to one another and sloped at an angle of 45/ with respect to the bearing surface or two pairs of tracks arranged offset by 90/, in which the cylindrical rollers 19 (in an X arrangement) alternatively roll off in one of the two pairs of tracks.

Since the cross cylindrical roller bearing 16 used can handle any combination of axial, radial and breakdown torque loads, no second bearing is needed. A four-point bearing can also be used instead of a cross cylindrical roller bearing.

In order to prevent rotation of the rotor 9 at any time and to obtain control signals for interrupting the power supply to the torque motor 6, electromechanical means 20 formed by an electric magnet are provided in the housing 8 of the actuating unit 2. The electric magnet 20 consists of a stationary winding 21 in the housing 8 as well as an armature 22 which is rotationally coupled to the rotor 9 or the threaded nut 11 in such a manner that it can undergo limited longitudinal displacement in an axial direction.

In order to definitely acknowledge contact between the friction linings 4, 5 and the brake disc 3, contact pins 26 are provided on the friction linings 4, 5. The inside space of the housing 8 is protected against contamination, for example, spray water, by a cover 23 that is located in the vicinity of the electric magnet 20 and holds the winding 21, on the one hand, and by an elastic, membrane-like sealing 27, on the other hand. For this purpose, the sealing 27 preferably is to be mounted between the actuating element 30 or the threaded spindle 14 and a retaining ring 32 axially abutting against an outer bearing ring 18.

Finally, so as to be able to effectively pass off the heat generated during the operation of the torque motor 6 to the environment, the housing 8 has large cooling ribs 33.

Figure 2:
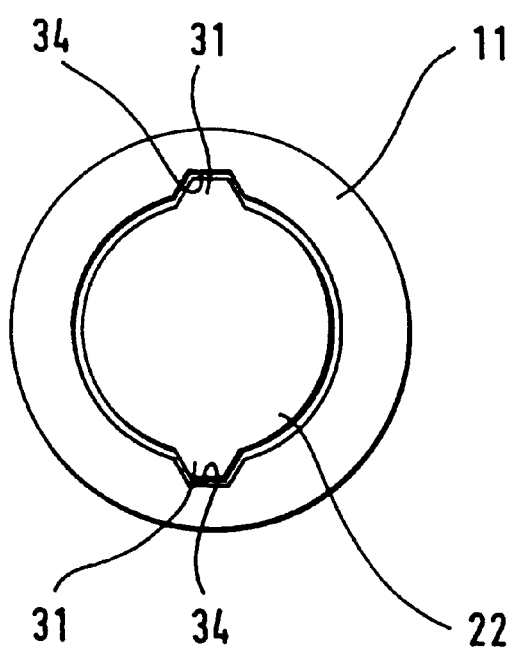
FIG. 2 shows a first embodiment of the connection between the threaded nut and the armature.

FIG. 2 shows the previously mentioned rotational coupling between the armature 22 and the threaded nut, which preferably is effected through a positive-locking connection between the two parts. For this purpose, the armature 22 has two radially opposite projecting parts 31 having a trapezoidal cross-section, which are received by two correspondingly shaped grooves 34 in the wall of the cylindrical bore of the threaded nut 11.

Figure 3:
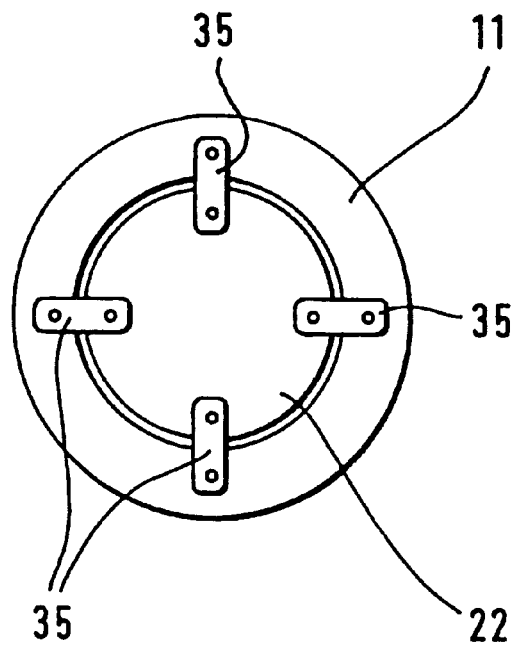
FIG. 3 is a second embodiment of the connection between the threaded nut and the armature.

In the embodiment shown in FIG. 3, the armature 22 is coupled to the threaded nut 11 by means of a non-positive connection, which, in the example shown, is formed by four flexible sheet metal strips 35 distributed equally around the circumference and fastened to the previously mentioned parts 11, 22 by means of suitable fastening means. The axial stroke of the armature 22 required for activating the electric magnet 20 is limited by the elasticity of the sheet metal strips 35.

Figure 4:
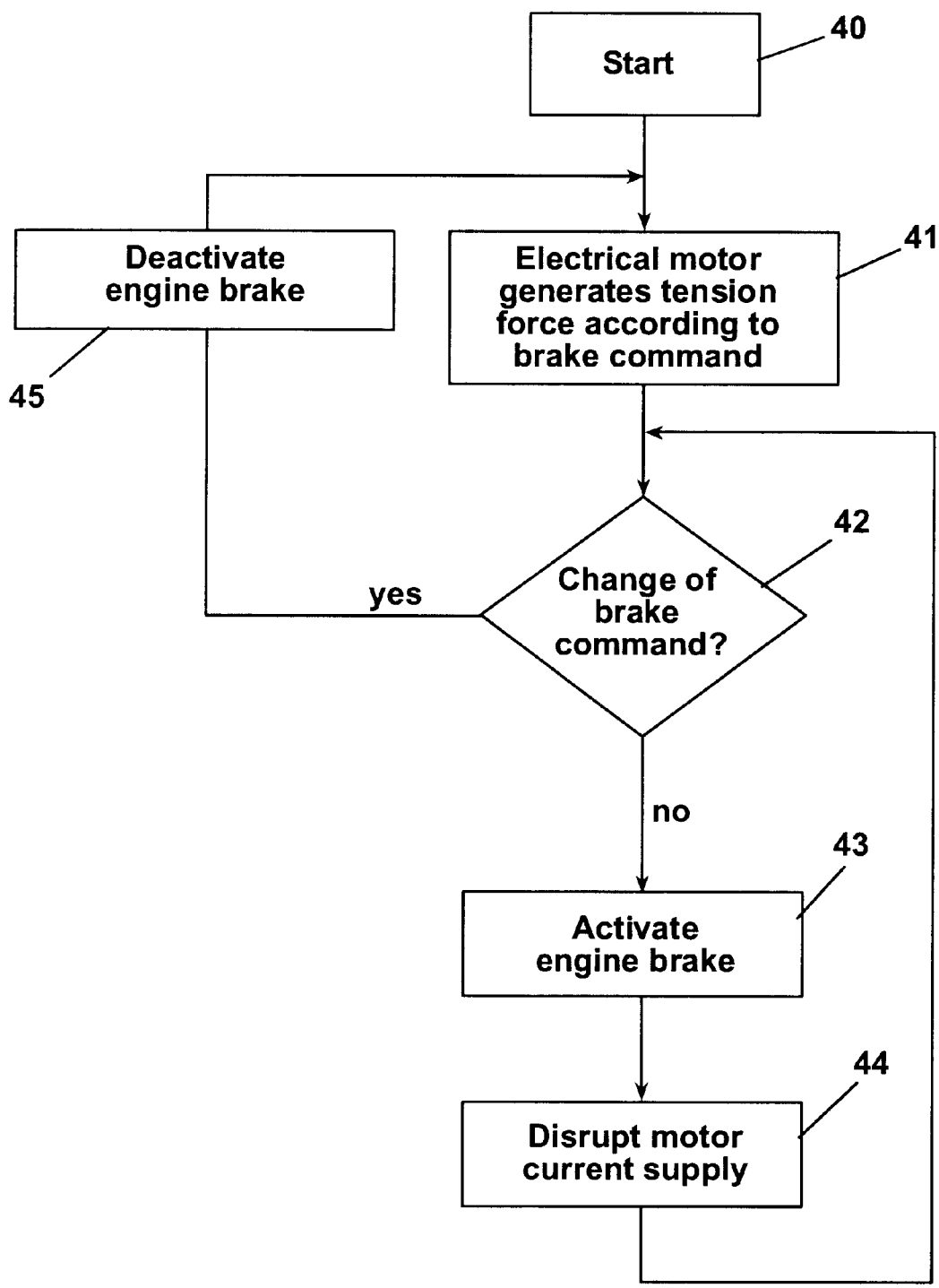
FIG. 4 is a flow diagram of the function of the disc brake according to the present invention.

How the disc brake according to the present invention functions is illustrated by the flow diagram provided in FIG. 4.

The activation of the brake is initiated with step 40 'Start' which causes a brake pedal (not shown) to be activated. A sensor, which also is not shown, that detects the brake action, for example a brake-light switch, generates a control signal that is supplied to the electronics which activate the electric motor 6.

In step 41, the electric motor 6 activated by the electronics generates a clamping force according to the brake action, which causes the friction linings 4,5 to come into contact or press against the brake disc 3.

In step 42, 'Change of brake action?', the system queries whether a change in the brake action took place after expiration of a defined period of time. If this is not the case, the electric magnet 20 is activated in step 43 'Activate motor brake' and the current supply to the electric motor 6 is interrupted subsequently through step 44 'Interrupt current supply to motor', so that the clamping force applied at the beginning of the braking action is maintained.

When the brake action is changed, for example by releasing the brake or increasing the braking force, step 45 'Deactivate motor brake' causes the current supplied to the electric magnet 20 to be switched off, so that the threaded nut 11 is released and can carry out a rotational movement which results in an adjustment of the threaded spindle 14 as required.

What is claimed is:

1. An electromechanically operated disc brake for motor vehicles with a brake disc and a brake caliper, with an actuating unit provided on the brake caliper and with two friction linings, each of which acts together with one side of a brake disc respectively and which are arranged in the brake caliper in such a way that a limited displacement is possible, wherein one of the friction linings is brought into engagement directly with the brake disc by means of an actuating element through the actuating unit and the other friction lining is brought into engagement with the brake disc through the effect of a reaction force generated by the brake caliper, and wherein the actuating unit exhibits an electric motor with a rotor, arranged coaxially to the actuating element as well as a reducing gear arranged between said electric motor and the actuating element, as well as means which prevent reverse rotation of the rotor of the electric motor when the current supplied to the electric motor is switched off after the electric motor was activated, wherein the means are made up of an electric magnet whose armature is coupled to the rotor in a rotationally and longitudinally displaceable manner.

2. An electromechanically operated disc brake according to claim 1, wherein the means are made up of an electric magnet whose armature is coupled to the rotor in a rotationally and longitudinally displaceable manner.

3. An electromechanically operated disc brake according to claim 2, wherein the rotor of the electric motor is ring-shaped, encompasses the reducing gear radially, and acts together with a threaded nut, which activates an actuating element that can be axially displaced, wherein there is a non-positive connection between the armature and the threaded nut.

4. An electromechanically operated disc brake according to claim 3, herein the coupling between the armature and the threaded nut is achieved by means of a positive-locking connection.

5. An electromechanically operated disc brake according to claim 4, wherein the positive-locking connection consists of radial projecting parts formed integrally with or provided on the armature, which are received by grooves provided in the threaded nut.

6. An electromechanically operated disc brake according to claim 3, wherein there is a non-positive connection between the armature and the threaded nut.

7. An electromechanically operated disc brake according to claim 6, wherein the non-positive connection between the armature and the threaded nut is obtained by means of flexible sheet metal strips which allow a limited relative displacement of both parts towards each other in an axial direction.

8. An electromechanically operated disc brake according to claim 1, wherein the electric magnet has a high-resistance winding.

* * * * *

UNITED STATES PATENT AND TRADEMARK OFFICE
CERTIFICATE OF CORRECTION

PATENT NO.    : 6,158,558  
DATED         : December 12, 2000  
INVENTOR(S)   : Karlheinz Bill, Jurgen Balz and Vladimir Dusil It is certified that error appears in the above-identified patent and that said Letters Patent is hereby corrected as shown below:

<u>Column 4,</u>
Line 63, change "herein" to -- wherein --.

Signed and Sealed this

Twenty-fourth Day of September, 2002

Attest:

JAMES E. ROGAN
Attesting Officer   Director of the United States Patent and Trademark Office